United States Patent [19]

Schlenger et al.

[11] Patent Number: 5,497,548
[45] Date of Patent: Mar. 12, 1996

[54] METHOD OF MAKING RINGS FOR GEARS HAVING INTERNAL OR EXTERNAL TOOTHING

[75] Inventors: Manfred Schlenger, Gilching; Hermann Hald, Leonberg, both of Germany

[73] Assignee: Deutsche Forschungsanstalt für Luft- und Raumfahrt e.V., Cologne, Germany

[21] Appl. No.: 125,757

[22] Filed: Sep. 24, 1993

[30] Foreign Application Priority Data

Sep. 26, 1992 [DE] Germany ............ 42 32 316.9

[51] Int. Cl.⁶ .................................. F16H 55/14
[52] U.S. Cl. ............... 29/893; 29/893.37; 74/DIG. 10; 242/4 R
[58] Field of Search ................. 29/893.3, 893.1, 29/893.2, 893.37, 893; 74/640, DIG. 10; 242/4 R, 7.01, 7.04

[56] References Cited

U.S. PATENT DOCUMENTS

| 1,501,026 | 7/1924 | Guay | 29/893.1 |
| 3,741,287 | 6/1973 | Mittman | 29/893.2 |
| 4,237,175 | 12/1980 | Kobayashi | 74/DIG. 10 |

FOREIGN PATENT DOCUMENTS

| 3523941 | 7/1985 | Germany. | |
| 58-168527 | 10/1983 | Japan | 29/893.37 |

Primary Examiner—P. W. Echols
Attorney, Agent, or Firm—Browdy and Neimark

[57] ABSTRACT

To reduce the mass of internally or externally toothed gears, a thin metal ring having internal or external toothing is made and bonded to a ring of fibrous composite material. Furthermore, to make rings for gears having internal or external toothing, fabric hoses of fibrous composite materials having a fibre orientation of ±45° are applied in a number of layers in the peripheral direction to the bottom and side flanks of a U-shaped groove-like depression of a rotating production device; the remaining free space in the interior of the applied fabric hose layers is filled with a unidirectionally wound roving, thereby forming an integral ring after the curing or hardening. Moreover, to make rings for gears having internal or external toothing, two thin-walled rings of fabric laminates serving as shear walls and having a fibre orientation of ± 45° for taking up the shear load and comprising carbon-fibre-reinforced plastics or plastics with other reinforcing fibres are adhesively bonded after the curing to a unidirectional winding applied between the annular shear walls of the rings for taking up the bending load.

6 Claims, 4 Drawing Sheets

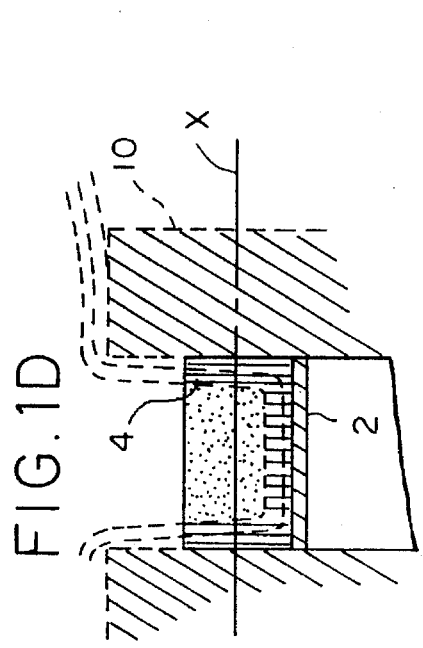
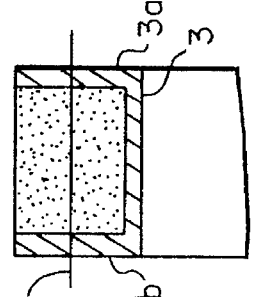
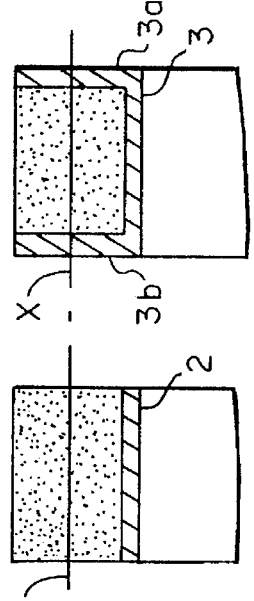
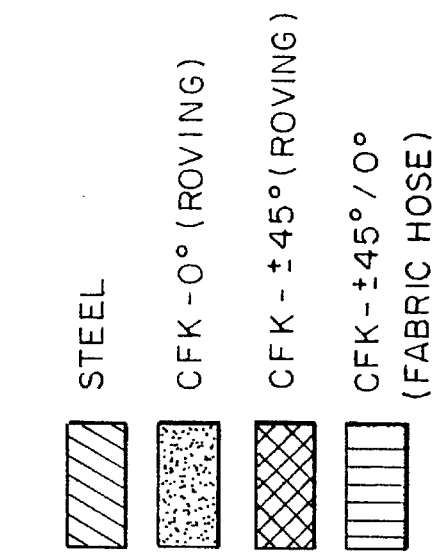
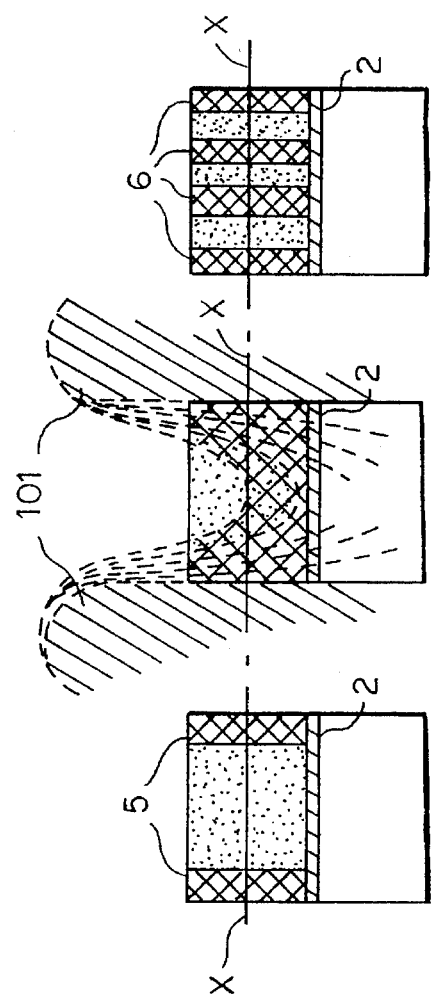

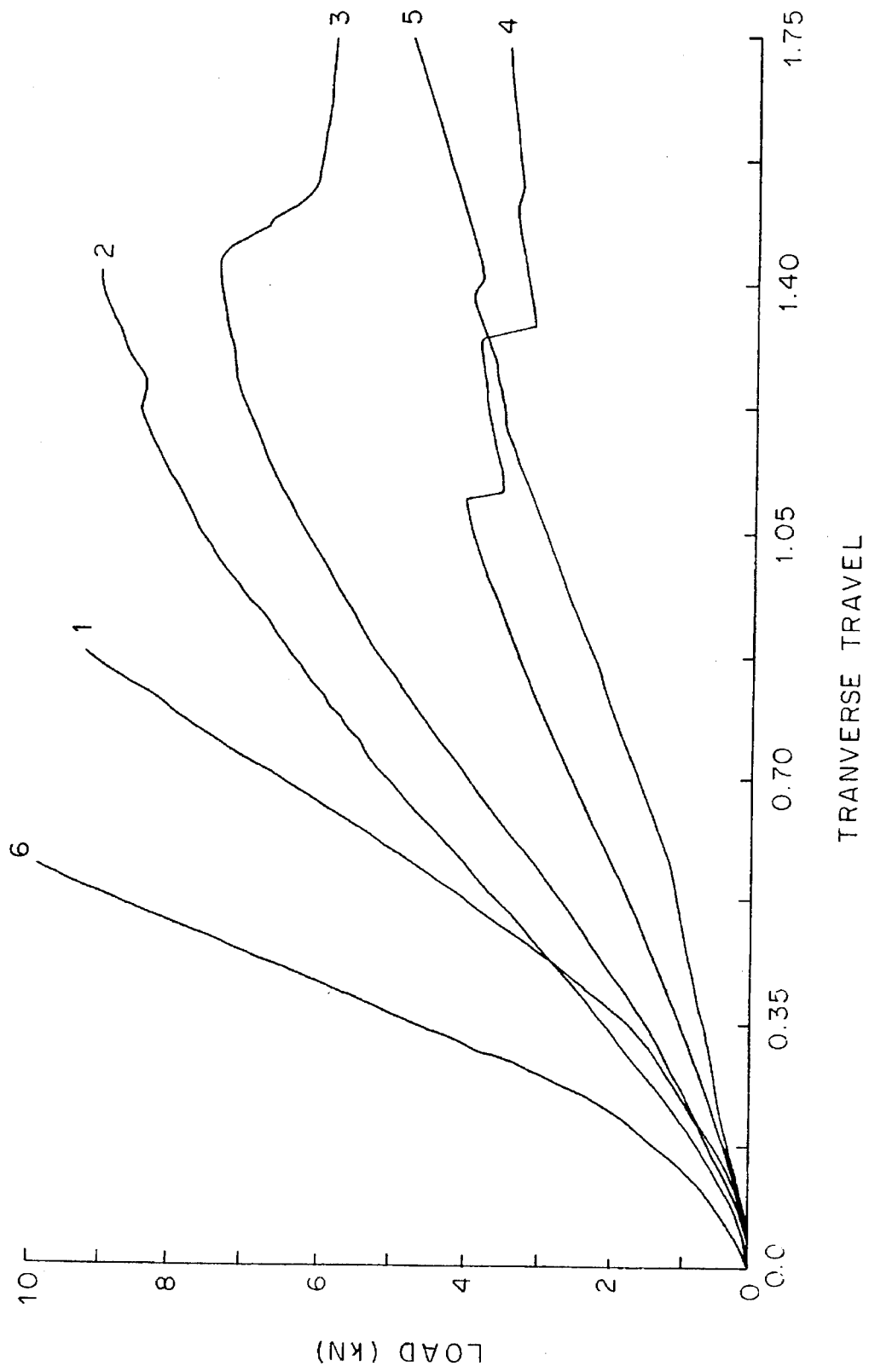

METHOD OF MAKING RINGS FOR GEARS HAVING INTERNAL OR EXTERNAL TOOTHING

BACKGROUND OF THE INVENTION

1. Field of the Invention

The invention relates to a method of making rings for gears having internal or external toothing and the use of such an integral ring for making internally or externally toothed gears.

Robots, in particular industrial robots, must be very stiffly constructed in order to achieve good positioning accuracy. Since as a rule conventional materials such as steel or cast iron are used, large and poor acceleration values result, due to the large masses of the drives and in particular of the transmissions. Drives and transmissions which are frequently used in such cases are those of the company Harmonic Drive, which hereinafter will be referred to as Harmonic Drive transmissions.

Harmonic Drive transmissions of the HDUC series consist essentially of three components or assemblies, that is a so-called wave generator (WG), a so-called flexible spline (FS) and a circular spline (CS).

The wave generator here has the form of an elliptical disc with central hub and an externally arranged special ball bearing. The flexible spline is a cylindrical steel bush with external toothing and has a flange at the bottom. The circular spline is a ring having internal toothing. All three components are made from iron alloys.

The elliptical wave generator which acts as the driven part in this case, deforms the externally toothed flexible spline via its ball bearing. In the oppositely disposed regions of the major ellipse axis, about 20% of all the teeth are in continuous engagement with the internally toothed circular spline, which has two teeth more than the flexible spline. By rotation of the wave generator the tooth meshing with the internally toothed circular spline is displaced corresponding to the major ellipse axis. As a result, after half a revolution of the wave generator a relative movement through one tooth takes place between the flexible spline and the circular spline, preferably mounted on the housing, or through two teeth after one complete revolution.

If, for example, the circular spline is fixed, the flexible spline rotates oppositely to the wave generator. The input-torque is therefore imposed on, the wave generator, whereas the output-torque can be taken off the flexible spline. To balance the difference of input-torque and output-torque the circular spine therefore must be mounted on the housing of the transmission. The wave generator therefore serves as drive-side component whilst the circular spline is employed for mounting and supporting on the housing and the flexible spline is the driven component.

A mass division for two Harmonic Drive transmissions is shown in the following Table I:

TABLE I

| Type | HDUC 80 IH Weight | HDUC 80 IH Proportion of the total weight | HDUC 32 Weight | HDUC 32 Proportion of the total weight |
| --- | --- | --- | --- | --- |
| Circular Spline | 7.60 kg | 48.1% | 0,60 kg | 50.0% |
| Flexible Spline | 2.45 kg | 15.5% | 0.25 kg | 20,8% |
| Wave Generator | 5.75 kg | 36.4% | 0.35 kg | 29.2% |
| Total Weight | 15.8 kg | 100% | 1.20 kg | 100% |

As apparent from Table 1, with a mass proportion of about 50% the circular spline makes the greatest contribution to the total mass.

In the tooth meshing region of the circular spline, the peripheral load and the tooth geometry result in a radially outwardly acting force component which effects a widening of the metal ring. The circular spline must therefore have a very high deformation stiffness so that a tooth jumping cannot occur between the flexible spline and the circular spline due to high torques or short overloading of the transmission. Consequently, this above described load does not result in a pure bending stresses in the material but includes particularly pronounced shearing loads. So far the hitherto used isotropic material metal is fundamentally very well suited to this type of load.

For introducing the forces or moments a flange mounting is employed, i.e. in the external ring of the circular spline mounting bores are arranged along a circular line. Here, the hitherto used material metal guarantees an adequately high hole bearing strength of these bores. In addition, in the construction of the entire gear from metal a substantially uniform coefficient of thermal expansion is ensured and consequently at elevated temperatures there is no danger of seizure.

A disadvantage of the conventional Harmonic Drive transmissions is the excessive mass. If such a transmission is employed in an articulate drive of a robot, in particular in robots having long arms this excessive mass leads to high torques in the drives lying closer to the base. To achieve an adequate positioning accuracy the structure and drives must therefore be made very stiff and this again results in large masses. This in turn leads to the mass which can be transported being small compared with the robot total mass and also enables only small accelerations to be achieved.

SUMMARY OF THE INVENTION

The invention therefore has as its object the provision of a method of making rings for gears having internal or external toothing by which the mass of such gears and thus the mass of transmissions constructed from such gears is very decisively reduced without impairing the functionality, efficiency and loadability of such transmissions in any way.

The invention therefore is directed to a method for making rings for gears having internal or external toothing wherein woven fabric hoses made out of fibrous material having a fiber orientation of ±45° are arranged for taking up a shearing load are arranged in a plurality of layers in the peripheral direction on the bottom and on the side flanks of a U-shaped groove-like depression of a rotating production device and the remaining free space in the interior of the applied fabric hose layers is filled with a unidirectionally wound roving for taking up the bending load, an integral ring thereby being formed after the hardening.

The invention is further directed to a method for making rings for gears having internal or external toothing wherein with the aid of a winding method for automated endless processing of a resin-impregnated fibrous roving the winding is conducted from the small internal diameter of a U-shaped groove-like depression of a rotating production device to the large outer diameter thereof, and thereby with appropriate choice of the diameter ratio at the side flanks a 45° angle is formed to an imaginary local peripheral tangent, and by cyclic displacement in the direction of rotation and a reversal of the direction of rotation of a filament support a uniform shear wall of ±45° fibre orientation is formed on both side flanks, and in the course of the winding progress in the remaining free space the filament path increasingly acquires both a transverse component and a component in the peripheral direction on each side change.

The invention is moreover directed to a method for making rings for gears having internal or external toothing wherein two thin-walled rings of fabric laminates serving as shear walls and having a fibre orientation of ±45° for taking up the shear load and comprising carbon-fibre-reinforced plastics or plastics with other reinforcing fibres are adhesively bonded after the curing to a unidirectional winding applied between the annular shear walls for taking up the bending load.

The aforementioned integral ring may be used for making internally toothed gears in that such an integral ring is fixedly bonded to a structured external peripheral surface of a thin-walled ring having internal toothing. Internally or externally toothed gears may be made using such an integral ring in that the lateral integral ring is bonded to a thin-walled metal ring for the internal or external toothing.

According to the invention, to overcome the difficulties encountered in Harmonic Drive transmissions constructed in conventional manner as described at the beginning, the metal used hitherto in such transmissions is replaced in suitable manner, that is in a manner adapted to the loading, by composite fibrous materials, preferably of high-modulous fibres, in particular by carbon-fibre-reinforced plastics (CFRP). For this purpose, for example, in a Harmonic Drive transmission of the HDUC type the original circular spline can be reduced to a metal ring having a very small wall thickness which then carries only the inner toothing. The loads occurring in such a transmission are then taken over by a "winding of carbon-fibre-reinforced plastics".

By using composite fibrous materials, a reduction of the mass can be achieved in transmissions, for example of about 30% in Harmonic Drive transmissions, without impairing the performance data, for example the maximum torque or the temperature use range. When using transmissions made up to a considerable extent from gears made according to the invention, said transmissions can advantageously be employed in robots in which for example the deflection of a relatively long robot arm due to its own weight is considerably reduced, in particular due to the reduction of weight of the transmission mounted at the arm end.

With robots on whose long arms articulate drives having transmissions constucted from gears according to the invention are mounted it is therefore possible to transport considerably greater masses compared to the robot's total weight than it is the case with joint drives hitherto employed; also, considerably higher accelerations can be achieved.

BRIEF DESCRIPTION OF THE DRAWINGS

The invention will be described in detail hereinafter with reference to preferred embodiments with the aid of the attached drawings, wherein:

FIG. 1A shows a schematic comparison of a construction of a conventional circular spline of a Harmonic Drive transmission; FIGS. 1B, 1C, 1D, $1E_1$, $1E_2$ and $1E_3$ show different production variants of circular splines of Harmonic Drive transmissions made partly by the method according to the invention;

FIG. 4 is a diagram corresponding to FIG. 3 of graphs of load tests of differently bored test rings.

DESCRIPTION OF THE PREFERRED EMBODIMENTS

Figure 2A:
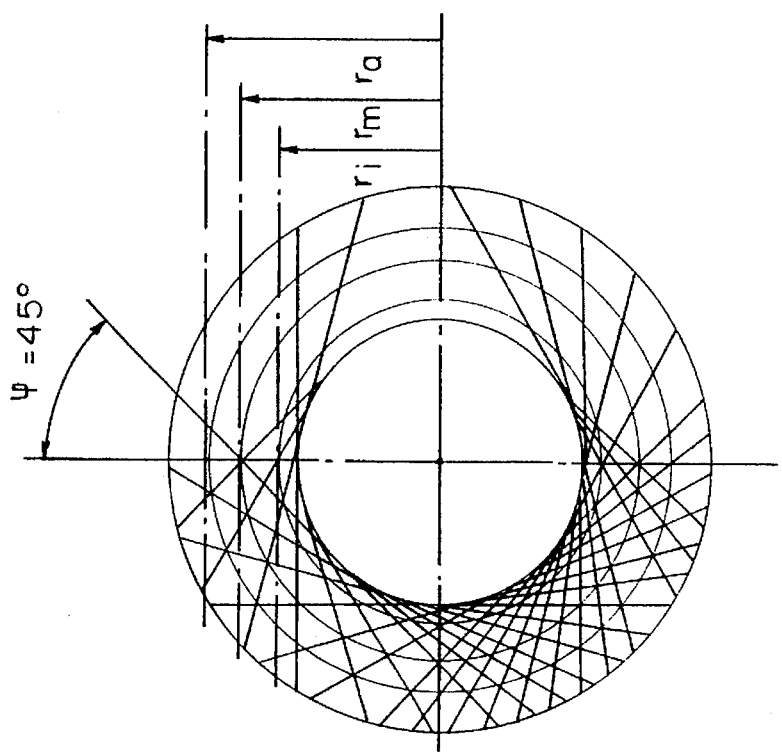
FIG. 2A is a schematic illustration of the path of a roving in an integral ring made according to the invention for a circular spline of a Harmonic Drive transmission.

It can quite generally be stated that the high specific properties of fibrous composite materials (FCM) can only be utilized fully if it is possible to use optimally the actual anisotropic properties by corresponding machining or configuring of a component. Since for example the individual components of a Harmonic Drive transmission do not involve a pure bending problem, an only unidirectionally (UD) wound ring leads to quite inadequate deformation stiffnesses even when employing high-modulus carbon fibres, as it is apparent for example from the curves ④ and ⑤ of FIG. 3, which will be discussed in detail later.

The method according to the invention creates a mode of construction in which a corresponding shear unit with a fibre orientation of ±45° with respect to the local tangent direction of a ring of for example a circular spline is integrated into such a unidirectional winding. At the same time this "integral ring" has the advantage that it exhibits a very high hole bearing strength of the force introduction bores, this being considerably higher for a purely unidirectionally wound ring. In addition, the mixed fibre orientation based on a laminate structure and the specific thermal expansion properties of the carbon fibre in conjunction with the polymer matrix results in a total thermal expansion coefficient corresponding substantially to that of iron alloys. Moreover, difficulties due to thermal expansions can be avoided within the operating limits of the transmission.

FIG. 1 shows various embodiments and production modifications of a circular spline for a Harmonic Drive transmission, the internal toothing not being shown in FIG. 1. In the following enumeration, the structure and configuration of the various versions FIG. 1A to E3 will be described, and thereafter the production variants made by the method according to the invention will be discussed.

Version FIG. 1A corresponds to the conventional construction in the form of a series product of a circular spline of a Harmonic Drive transmission made from iron alloys. Here, the entire ring 1 including the internal toothing, not illustrated, is made from an iron alloy or cast iron. The full line entered in this version indicates the centre line of one of the bores which are uniformly distributed along the periphery of the circular spline.

Version FIG. 1B represents a circular spline of fibrous composite materials wound unidirectionally in the peripheral direction, the winding being arranged on a thin-walled ring 2. Similar to version FIG. 1A, in version FIG. 1B as well; the full horizontal line, denotes the center line of one of the bores which are uniformly distributed on the periphery of said circular spline.

Moreover, for series production windings of several circular splines can be made in one working operation by clamping them centered side by side.

In version FIG. 1C a circular spline of fibrous composite materials wound unidirectionally in the circumferential direction is shown, a thin-walled ring 3 of metal forms a unit with two lateral additional shear walls 3A and 3B. The two additional shear walls facilitate production because a sliding off of the roving is prevented on both sides. At the same time, shear stresses occurring at the two lateral shear walls, 3A and 3B are taken up without difficulty.

In version FIG. 1D shear walls 4 of fabric hose of carbon-fibre-reinforced plastics having a fibre orientation of ±45° are wound in the number of layers on a thin-walled ring 2 and fixedly bonded to the latter. In this case, the fabric hose 4 in version FIG. 1D is wound in the peripheral direction onto the ring 2 held in a schematically indicated production device 10 in such a manner that the fabric hose projects on both sides beyond the subsequent outer surface of a circular spline. This type of winding of a fabric hose of carbon-fibre-reinforced plastic simultaneously provides a lateral cross linking of the fibrous composite ring. The fabric of the hose is so flexible that during the winding operation it readily adapts itself in form to the U-shaped groove-like depression in the production device 10. After a number of layers of the fabric hose have been applied in the manner described, of which for clarity in version FIG. 1D only two layers are indicated, the free inner space remaining between the lateral walls is filled with a unidirectionally applied winding, thereby ensuring also a good laminate application to the side flanks formed from the fabric hose 4 due to the filament tension.

In version FIG. 1 E1 shear walls 5 of carbon-fibre fabric have been made separately and together with a unidirectionally applied winding adhesively bonded to a thin-walled ring 2. The annular shear walls 5 here may be made in various manners. For example, the annular shear wall 5 may be cut from carbon-fibre fabric and depending on the width desired a different number of layers are then bonded together, producing a corresponding laminate. A disadvantage with this production method is that the rings must be subsequently finished.

However, in the production of the annular shear walls the converse procedure may be adopted in that firstly carbon-fibre-reinforced plastic plates of fabrics or prepregs are laminated and the shear walls 5 not cut out until after the curing.

A disadvantage of both methods is that the clippings arising is considerable. Moreover, due to the only stepwise change in fibre orientation of the individual blanks, only a quasi isotropic composite material is achieved.

In another method a carbon-fibre hose is laid in strip form in the desired radius, and thereby laminated until the desired width of the shear walls 5 is achieved. No clippings are formed with this method. However, using this method it is not possible to implement very small radii because folds otherwise occur in the hose.

Version FIG. 1 E2 is an integral circular spline made in a filament winding method as will be described in detail below.

Version E3 is a composite unit of a plurality of rings 6, which are made corresponding to versions FIGS. 1D, E1 or E2, thereafter hardened and then bonded together. For specific uses, this version is to be preferred because of the hole bearing properties and the symmetrical arrangement of the rings 6.

In version FIG. 1 E2 the circular spline of a Harmonic Drive transmission is formed by an integral ring which is made up of a thinwalled metal ring 2 having an internal toothing, not illustrated in FIG. 1 and a unidirectionally applied winding with two lateral shear walls with the aid of an automated production cycle, a structural configuration of a circular spline is thereby made from fibrous composite materials which with regard to the deformation stiffness contains optimum components of a shear unit having a fibre orientation of ±45° and a bending unit having a fibre orientation of 0°.

FIG. 2A shows the basic production sequence. To obtain a ±45° composite the actual internal radius $r_i$ of the finished integral ring or of the circular spline is reduced by corresponding recesses of the production device. If the filament winding method is employed for automated endless processing, the carbon fibre roving can be guided from the small internal diameter, which in FIG. 2A is smaller than the indicated internal radius $r_i$, over the large external diameter of the production device, said large external diameter being greater than the external radius $r_a$ of the finished integral ring. At the lateral flanks the roving then forms the necessary angle of 45° to an imaginary local peripheral tangent to a mean desired radius $r_m$, but only on the condition that the two diameters of the device have the correct ratio to each other.

By cyclic displacement in the direction of rotation and by a direction reversal of a filament support not shown in detail, as usual in tube winding operations, a uniform shear wall of ±45° is generated on both flank sides of the integral ring. As apparent from the schematic illustration of version FIG. 1 E2, because of the smaller diameter the groove bottom between two lateral support discs 101 is filled faster than the outer regions with increasing winding progress, and as a result, as likewise apparent from version FIG. 1 E2 a sort of parabolic covering cross-section results. Furthermore, the filament profile increasingly acquires both a transverse component and on every side change a peripheral component, this leading on the one hand to a transverse stiffening or cross-linking and on the other to a strengthening in the peripheral direction, i.e. a strengthening with regard robending with additional compacting of the laminate due to the filament tension. After hardening, a preferably splittable mold, as fundamentally apparent from the schematic illustration of FIG. 2B, is removed and thereafter the outer filament deflection turned down to the outer radius $r_a$ of the finished integral ring and the core turned out to the internal radius $r_i$ of the integral ring.

Figure 2B:
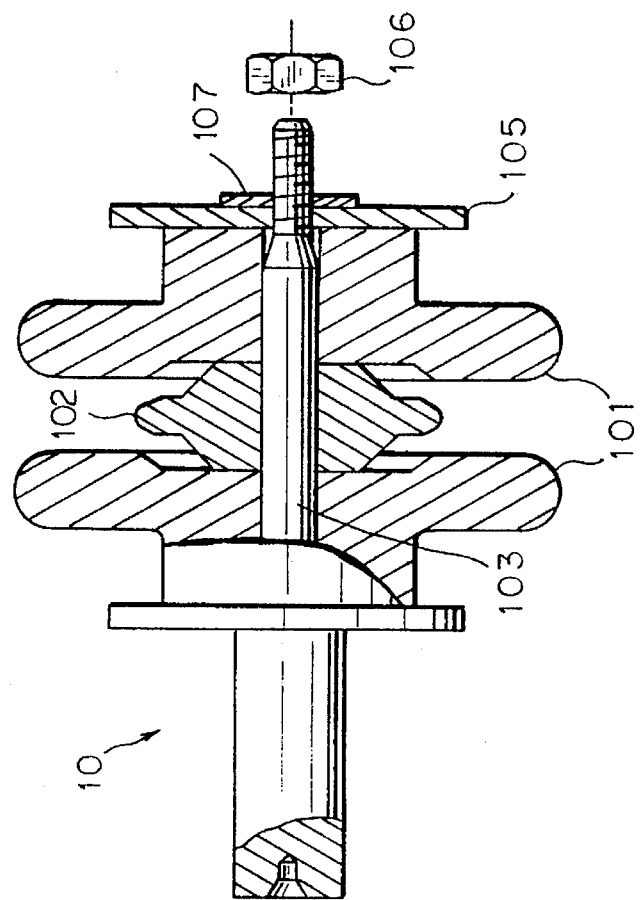
FIG. 2B is a partially sectioned schematic illustration of part of a rotating production device for making integral rings according to FIG. 2A.

To optimise the production with regard to series manufacturing winding cores 102 and the support discs 101 associated therewith can be arranged in a manner apparent from FIG. 2B in segmented form adjacent each other on a correspondingly dimensioned support shaft 103 and pressed against each other by means of a suitable holding device, the holding device in FIG. 2B possibly having a correspondingly dimensioned application disc 105 which by means of a nut 106 mounted on a thread of the support shaft 103, with interposition of a washer 107, presses the individual support discs 101 and the winding core 102 arranged therebetween against each other. With a device made in this manner a number of integral rings (see FIG. 2A) can be automatically produced in one passage.

To ensure adequate torque transmission between a metal ring 2 with internal toothing and the ring or integral ring made from fibrous composite material, these two parts must be well joined together. There are various possibilities of doing this which can be combined in almost any desired way.

For example, the surface of the metal ring may be structured by sandblasting or shot-peening, thereby giving a micro form-locking. Furthermore, the two parts can be fixedly joined together by adhesive bonding. Also, by a geometric structuring of the contact surface between the two components, for example by facets across their circumference, a form-locking can be achieved. Depending upon the production method employed, the ring of fibrous composite material may possibly also be applied directly to a structured thin-walled ring gear (cf. versions D and E1 to E3). In this case subsequent joining may be dispensed with. Moreover, prior to joining the metal ring may be greatly cooled. In this case the production tolerances must be so selected that due to warming up a frictional joint results so that the finished circular spline exhibits internal stresses at room temperature. In addition, an adhesive connection may also be provided, although this should not usually be absolutely essential.

Figure 3:
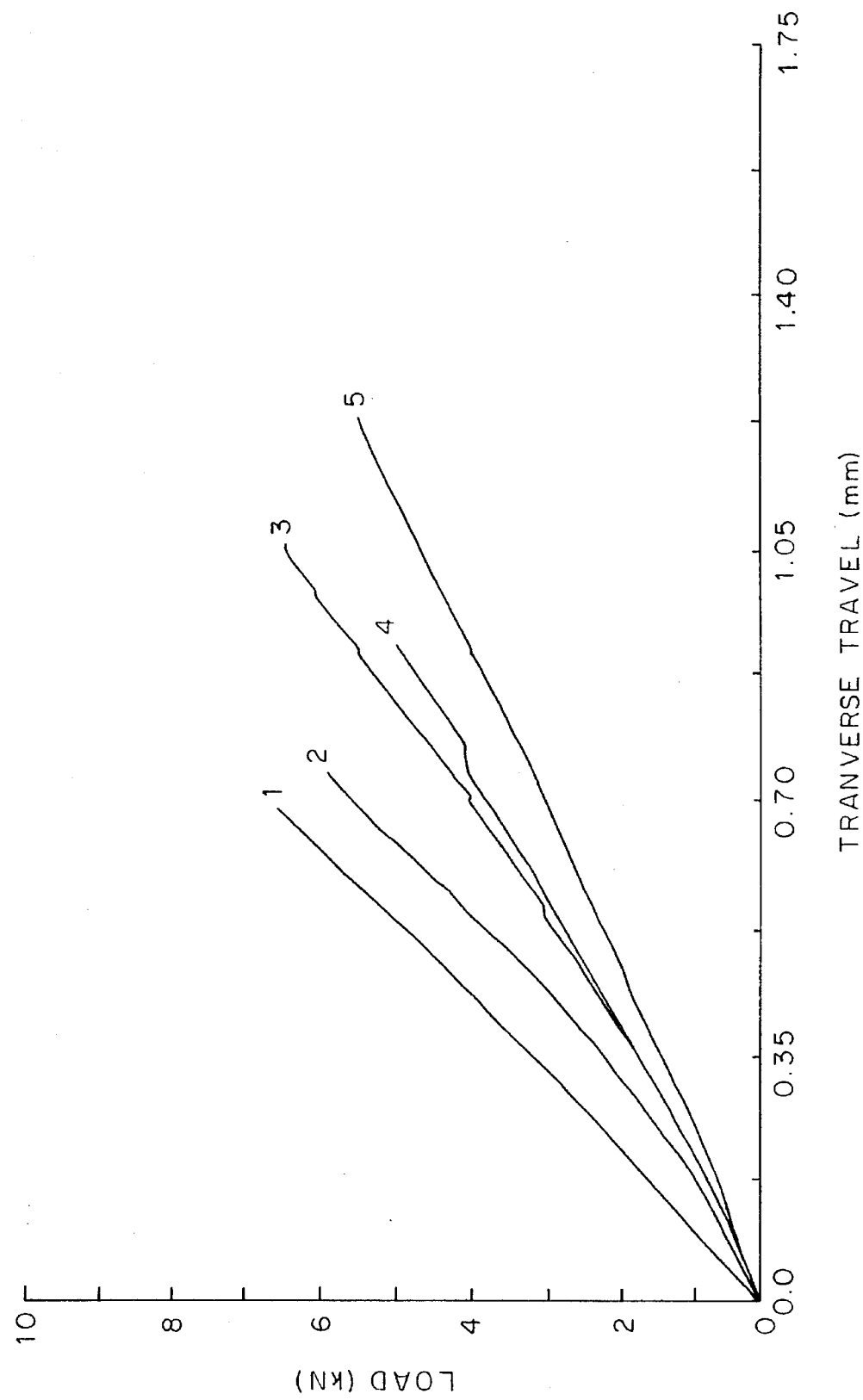
FIG. 3 is a diagram of the graph of load tests with different test rings.

In FIG. 3 the results of load tests on various circular spline test rings without internal toothing are shown. The transverse displacement is plotted in mm on the abscissa of the diagram and the load in kN along the ordinate. In FIG. 3, the curve denoted by ① is obtained with an undrilled specimen of steel analogous to the version A in FIG. 1. The curve denoted by ② was achieved with a steel ring having a unidirectional carbon-fibre-reinforced winding according to the version C. The curve denoted by ③ was obtained with an integral ring of carbon-fibre-reinforced plastic according to version E2 (with metal ring). The curve denoted by ⑤ was obtained with a purely unidirectionally wound ring of carbon-fibre-reinforced plastic (version B) whilst the curve denoted by ⑤ was obtained with a purely unidirectionally wound ring of glass-fibre-reinforced plastic (version B).

For the tension tests as illustrated in FIG. 3 test rings (without toothing) were made by various methods and tested without disturbance in a pulling machine. As clearly apparent from the diagram, the load is a shear-dominated one. The thickness of the two lateral shear walls in the integral solution according to version E2 was in each case only 0.5 mm for a total width of the ring of 20 mm. In spite of the only small volume proportion of the shear walls 4, under higher loads appreciably smaller deformations result with a pure unidirectional winding, as is even more clearly apparent with the construction with metal flanks (version C and curve ②.) With an optimised structure, i.e. With an alternation between diagonal and longitudinal reinforcement, the stiffness of the pure metal ring (version A in FIG. 1 and curve ①) is thus certainly achievable.

In addition, the desired hybrid structure gives a substantially more favourable hole bearing resistance, which is of significance with regard to the force distribution. In particular, above all a better uniformity of the material and thus a more favourable thermal coefficient of expansion is achieved than with a pure unidirectional winding. With high probability any seizure of the transmission at relatively high operating temperatures can be excluded. However, the geometry of a circular spline must be adapted to the isotropic material metal regarding the necessary bores. For compatibility reasons, in the configurations made out of fibrous composite materials any modified geometry was dispensed although no doubt still better properties could be achieved with a shape adapted to the fibrous composite material.

In FIG. 4 a diagram corresponding to FIG. 3 is shown, the results of load tests of different, in this case bored, circular spline test rings being plotted(once again without toothing). For comparison, the unbored steel ring has again been shown (curve ⑥ in FIG. 1).

It will be apparent from the following Table II that depending on the nature of the structure of the ring of a circular spline the mass can be reduced to a greater or lesser extent.

TABLE II

| Type of CFR-winding | Mass of the CS | Mass related to mass of the metal CS | Mass reduction of the CS | Mass reduction of the entire transmission |
|---|---|---|---|---|
| Metal | 619 g | 100% | 0% | 0% |
| CFRP Uni/metal/flanks | 276 g | 44.6% | 55.4% | 27.7% |
| CFRP uni-directional | 172 g | 27.8% | 72.2% | 36.1% |
| CFRP integral | 165 g | 26.7% | 73.3% | 36.7% |

As apparent from Table I, in a Harmonic Drive transmission the so-called wave generator is a further component with a relatively high mass proportion. On constucting this wave generator component for example in accordance with versions D and E1 to E3 it would be possible to save approximately up to 50% of the mass.

Even with the small overall size of the Harmonic Drive transmission of type HDUC 32 IH, this would correspond to a saving of 15% of the transmission total mass. This has a further advantage. For due to the high transmission ratios, in robot drives the influence of the moment of mass inertia of the transmission input (with motor shaft) on the acceleration behaviour of a joint is quite considerable. Since compared with other transmissions, for example cyclo transmissions, Harmonic Drive transmissions have a relatively high moment of inertia at the input, amass reduction of the wave generator has a very positive effect on this.

In addition, the method of mass reduction according to the invention can also be applied to transmissions, for example AKIM transmissions, which are very similar to the Harmonic Drive transmission. Moreover, the production method according to the invention for integrated winding of unidirectionally wound rings with shear reinforcement can be employed in all cases where such rings of fibrous composite material are required, i.e. in instances of loads dominated by shear deformations.

To make externally toothed gears thin externally toothed metal rings are heated, fitted to rings of fibrous composite materials and thereafter again cooled to room temperature, a good frictional joint thereby being achieved between the metal ring and the FCM ring (of course, on heating the thin-walled externally toothed metal ring the temperature limit of the fibrous composite material must in no way be exceeded!).

We claim:

1. A method of making rings for gears having internal or external toothing comprising the steps of:
   arranging woven fabric hoses of composite fibrous materials in a plurality of layers in a circumferential direction on a bottom and on side flanks of a U-shaped groove depression of a rotating production device, wherein fiber orientation of the woven fabric hoses is at a ±45° angle to a longitudinal length of the hoses; and
   filling a remaining free space in an interior of the applied plurality of layers with a resin-impregnated fibrous thread wound in one direction, thereby forming an integral ring after hardening of the applied plurality of layers and the wound resin-impregnated fibrous thread.

2. A method according to claim 1, wherein the fibrous thread are formed from high modulus fibres.

3. A method according to claim 2, wherein carbon fibres are used as the high modulus fibres.

4. A method according to claim 1 further comprising the step of fixedly bonding the integral ring to a structured outer peripheral surface of a thin-walled ring with internal toothing.

5. A method according to claim 1 further comprising the step of adhesively joining the integral ring to a thin metal ring having internal or external toothing.

6. A method according to claim 1, further comprising the steps of cooling a metal ring having internal toothing for joining the metal ring to the integral ring, the metal ring being cooled prior to joining the metal ring to the integral ring, inserting the metal ring into the integral ring and thereafter warming the metal ring and the internal ring to ambient temperature, whereby due to the resulting expansion of the metal ring a frictional joint is created between the internally toothed metal ring and the integral ring.

* * * * *